United States Patent
Lo et al.

(10) Patent No.: US 10,921,933 B2
(45) Date of Patent: Feb. 16, 2021

(54) TOUCH DETECTION APPARATUS AND TOUCH DETECTION METHOD

(71) Applicants: Chih-Hsuan Lo, Hsinchu (TW); Chia-Shen Hsu, Hsinchu (TW)

(72) Inventors: Chih-Hsuan Lo, Hsinchu (TW); Chia-Shen Hsu, Hsinchu (TW)

(73) Assignee: ITE Tech. Inc., Hsinchu (TW)

( * ) Notice: Subject to any disclaimer, the term of this patent is extended or adjusted under 35 U.S.C. 154(b) by 0 days.

(21) Appl. No.: 16/595,456

(22) Filed: Oct. 7, 2019

(65) Prior Publication Data

US 2021/0019013 A1    Jan. 21, 2021

(30) Foreign Application Priority Data

Jul. 19, 2019  (TW) .............................. 108125720 A

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04104* (2013.01)

(58) Field of Classification Search
None
See application file for complete search history.

(56) References Cited

U.S. PATENT DOCUMENTS

| 2013/0147752 A1* | 6/2013 | Simmons | G06F 3/044 345/174 |
| 2015/0242015 A1* | 8/2015 | Cho | G06F 3/0416 345/174 |

FOREIGN PATENT DOCUMENTS

| CN | 103984431 | 9/2017 |
| TW | 201203048 | 1/2012 |
| TW | 201319871 | 5/2013 |
| TW | 201519057 | 5/2015 |

OTHER PUBLICATIONS

"Office Action of Taiwan Counterpart Application", dated Mar. 19, 2020, p. 1-p. 12.

* cited by examiner

*Primary Examiner* — Joseph R Haley
(74) *Attorney, Agent, or Firm* — JCIPRNET

(57) ABSTRACT

A touch detection apparatus and a touch detection method are provided. The touch detection apparatus includes a sensing element and a detection circuit. The touch detection method includes the following steps. At least one touch sensing value is provided by the sensing element. Whether a first object touches the sensing element is determined by the detection circuit according to the at least one touch sensing value and a first reference value in a first stage. If the first object touches the sensing element, a second reference value is calculated by the detection circuit according to the at least one touch sensing value and the detection circuit enters a second stage. Whether a second object touches the first object is determined by the detection circuit according to the at least one touch sensing value and the second reference value in the second stage.

18 Claims, 8 Drawing Sheets

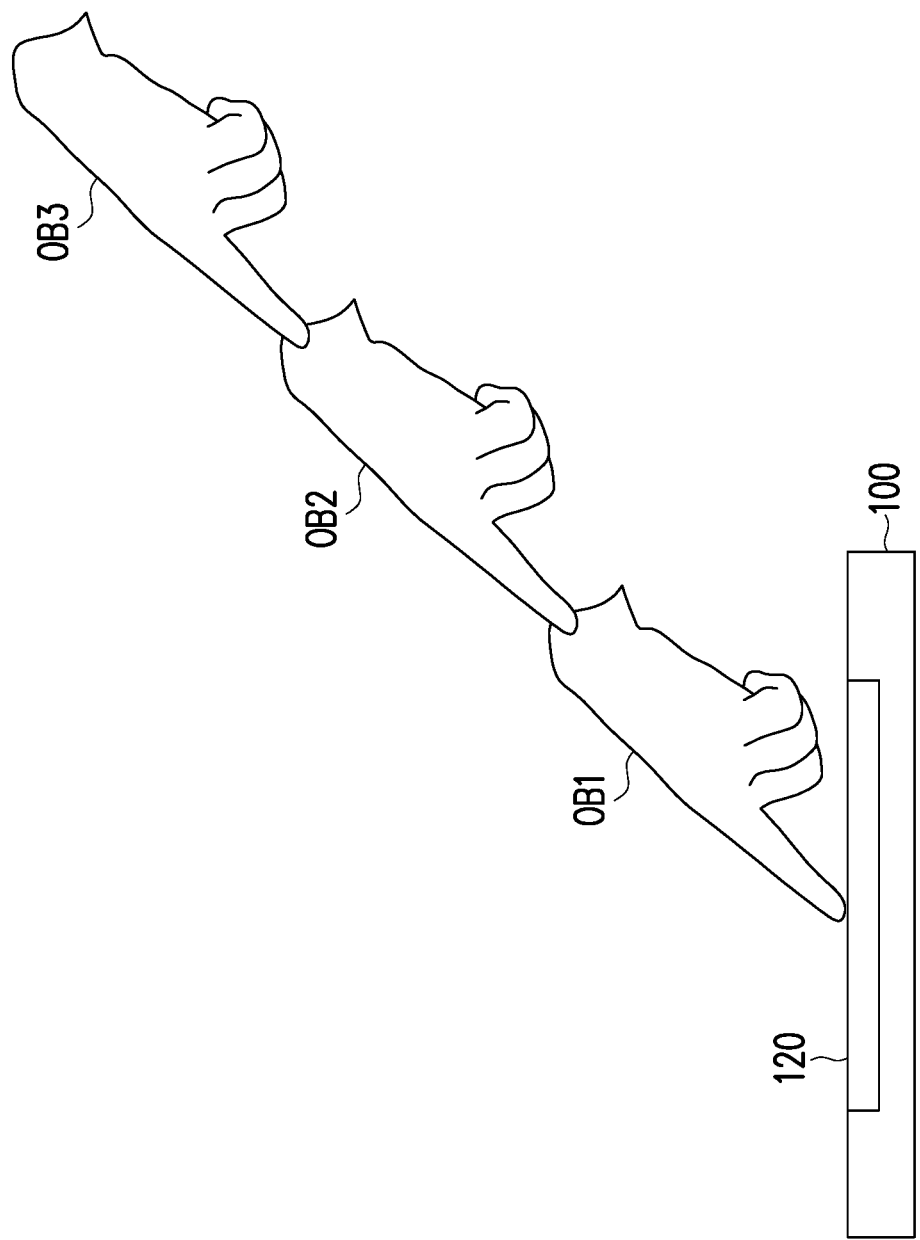

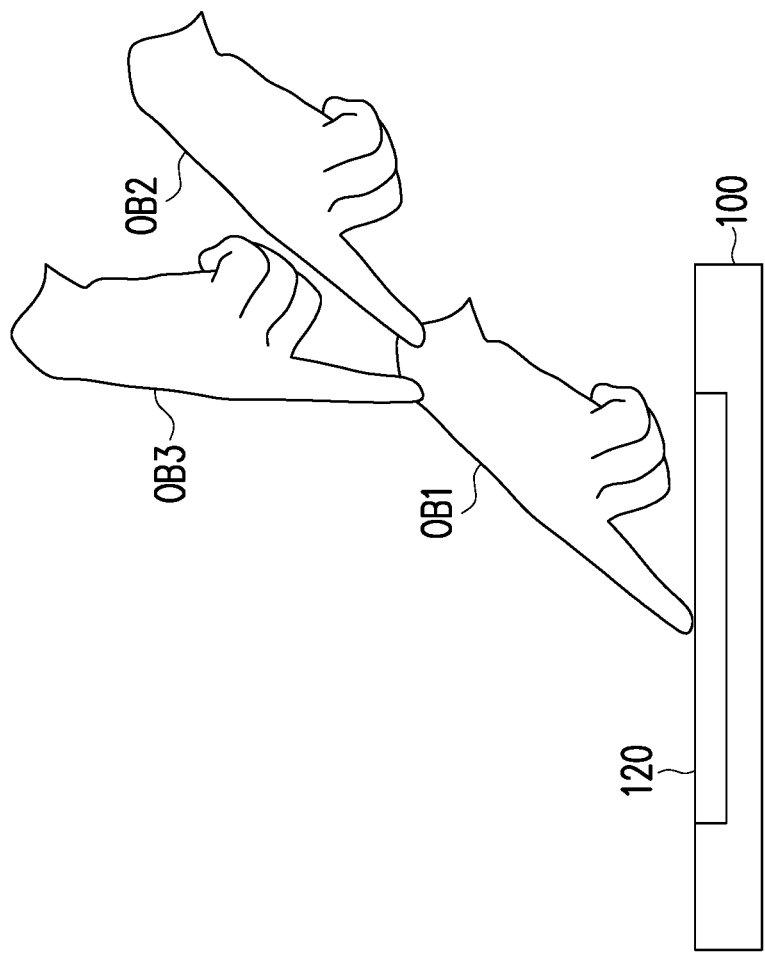

TOUCH DETECTION APPARATUS AND TOUCH DETECTION METHOD

CROSS-REFERENCE TO RELATED APPLICATION

This application claims the priority benefit of Taiwan application serial no. 108125720, filed on Jul. 19, 2019. The entirety of the above-mentioned patent application is hereby incorporated by reference herein and made a part of this specification.

BACKGROUND OF THE INVENTION

1. Field of the Invention

The present invention relates to a detection apparatus, in particular, to a touch detection apparatus and a touch detection method.

2. Description of Related Art

Generally speaking, a capacitive touch apparatus could detect the behavior that a first user touch the capacitive touch apparatus. However, in a condition that the first user touches the capacitive touch apparatus, the existing capacitive touch apparatus cannot detect the behavior that the second user touches the first user, resulting in limitation to the application of the capacitive touch apparatus.

In order to detect the behavior that the second user touch the first user, generally, an additional detection apparatus may be adopted to send a detection signal to the body of the user to assist the capacitive touch apparatus in detecting the behavior that the second user touches the first user. However, a doubt on safety may exist by sending the detection signal to the body of the user.

SUMMARY OF THE INVENTION

The present invention provides a touch detection apparatus and a touch detection method, which may determine whether a second object touches a first object according to a touch sensing value sensed by a sensing element of the touch sensing apparatus under the condition that the first object touches the sensing element.

The touch detection apparatus provided by the present invention includes a sensing element and a detection circuit. The sensing element is configured to generate at least one touch sensing value. The detection circuit is coupled to the sensing element to receive the at least one touch sensing value, and determines whether a first object touches the sensing element according to the at least one touch sensing value and a first reference value in a first stage. If the first object touches the sensing element, the detection circuit calculates a second reference value according to the at least one touch sensing value and enters a second stage. The detection circuit determines whether a second object touches the first object according to the at least one touch sensing value and the second reference value in the second stage.

The touch detection method provided by the present invention includes the following steps. Providing at least one touch sensing value by a sensing element. Determining whether a first object touches the sensing element by the detection circuit according to the at least one touch sensing value and a first reference value in a first stage. If the first object touches the sensing element, calculating a second reference value by the detection circuit according to the at least one touch sensing value and causing the detection circuit to enter a second stage. Determining whether a second object touches the first object by the detection circuit according to the at least one touch sensing value and the second reference value in the second stage.

Based on the above, the touch detection apparatus and the touch detection method provided by the present invention could determine whether the second object touches the first object under the condition that the first object touches the sensing element, and therefore, the application of the touch detection apparatus is wider. Moreover, the detection circuit determines the touch condition according to the touch sensing value provided by the sensing element, and the detection circuit determines the touch condition without sending a detection signal to the first object or the second object, and therefore, the use safety may be improved.

In order to make the aforementioned and other objectives and advantages of the present invention comprehensible, embodiments accompanied with figures are described in detail below.

BRIEF DESCRIPTION OF THE DRAWINGS

FIG. 2B is a schematic diagram of an application situation of a touch detection apparatus according to another embodiment of the present invention.

FIG. 2C is a schematic diagram of an application situation of a touch detection apparatus according to still another embodiment of the present invention.

DESCRIPTION OF THE EMBODIMENTS

Figure 1:
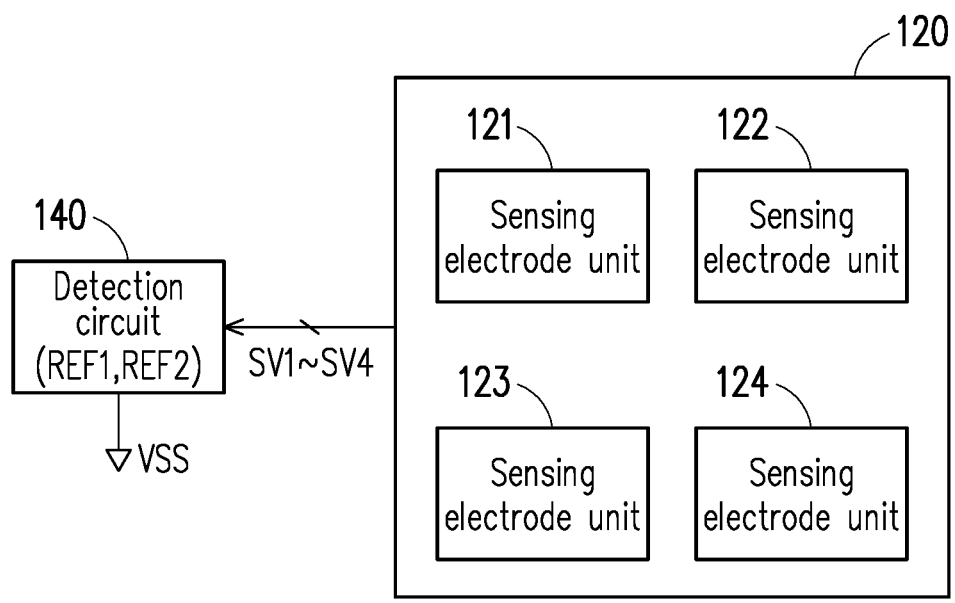
FIG. 1 is a block schematic diagram of a touch detection apparatus according to an embodiment of the present invention.

In order to make the content of the present invention more comprehensible, embodiments are described below as examples of implementation of the present invention. Wherever possible, the same reference numbers are used in the drawings and the description to refer to the same or like parts, components or steps.

Figure 2A:
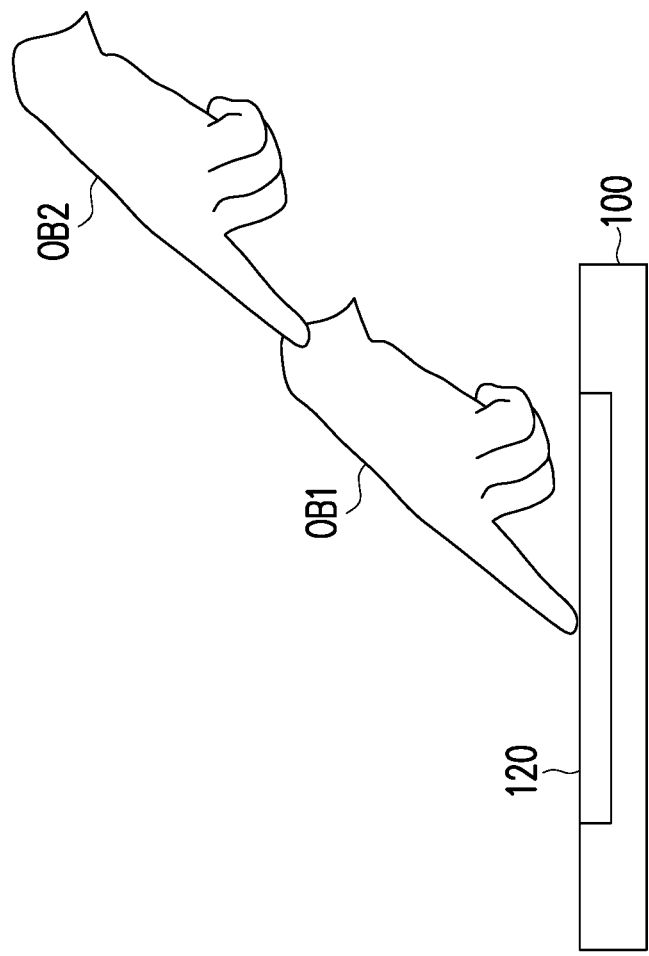
FIG. 2A is a schematic diagram of an application situation of a touch detection apparatus according to an embodiment of the present invention.

FIG. 1 is a block schematic diagram of a touch detection apparatus according to an embodiment of the present invention. FIG. 2A, FIG. 2B and FIG. 2C are respectively schematic diagrams of an application situation of a touch detection apparatus according to an embodiment of the present invention. Please refer to FIG. 1, FIG. 2A, FIG. 2B and FIG. 2C together. A touch detection apparatus 100 may be applied to the field of game machines, but is not limited thereto. The touch detection apparatus 100 may include a sensing element 120 and a detection circuit 140, but is not limited thereto. The sensing element 120 is configured to generate at least one touch sensing value. In detail, the sensing element 120 may include at least one sensing electrode unit, and the at least one sensing electrode unit is configured to generate the at least one touch sensing value.

However, for the sake of being convenient for illustrating and being concise in diagram forms, FIG. 1 illustrates by taking four sensing electrode units 121-124 as exemplary embodiments, and the sensing electrode units 121-124 respectively generate corresponding touch sensing values SV1-SV4. Moreover, the touch sensing values SV1-SV4 may be, for example, analog signals or digital signals after analog-to-digital conversion.

In an embodiment of the present invention, the sensing element 120 may be, for example, an existing capacitive sensing element, but is not limited thereto.

The detection circuit 140 is coupled to the sensing element 120 to receive the touch sensing values SV1-SV4. The detection circuit 140 may determine whether a first object OB1 touches the sensing element 120 (directly or indirectly) according to the touch sensing values SV1-SV4. In addition, under the condition that the first object OB1 touches the sensing element 120 (directly or indirectly), the detection circuit 140 may also determine whether a second object OB2 touches the first object OB1 after the first object OB1 touches the sensing element 120 according to the touch sensing values SV1-SV4. FIG. 2A draws an application situation that the second object OB2 touches the first object OB1 under the condition that the first object OB1 touches the sensing element 120 directly.

In an embodiment of the present invention, the detection circuit 140 may be implemented by adopting hardware circuits such as a micro controller, or a micro processor, or an application specific integrated circuit (ASIC) or a programmable logic device (PLD) or a field programmable gate array (FPGA), but the present invention is not limited thereto.

In an embodiment of the present invention, under the condition that the second object OB2 touches the first object OB1 and the first object OB1 touches the sensing element 120 (directly or indirectly), the detection circuit 140 may also determine whether a third object OB3 touches at least one of the first object OB1 and the second object OB2 according to the touch sensing values SV1-SV4. FIG. 2B draws an application situation that the third object OB3 touches the second object OB2 under the condition that the first object OB1 touches the sensing element 120 directly and the second object OB2 touches the first object OB1, while FIG. 2C draws an application situation that the third object OB3 touches the first object OB1 under the condition that the first object OB1 touches the sensing element 120 directly and the second object OB2 touches the first object OB1.

In the present embodiment, the first object OB1, for example, is the finger of a first user, the second object OB2, for example, is the finger of a second user, and the third object OB3, for example, is the finger of a third user, but the present invention is not limited thereto. In other embodiments of the present invention, the first object OB1, for example, is any part of the body of a first user, the second object OB2, for example, is any part of the body of a second user, and the third object OB3, for example, is any part of the body of a third user, which are determined according to practical application.

In an embodiment of the present invention, the first object OB1 touches the sensing element 120 indirectly may be that, for example, the first object OB1 touches the sensing element 120 by at least one other object (for example, the body part of at least one other user).

Figure 3:
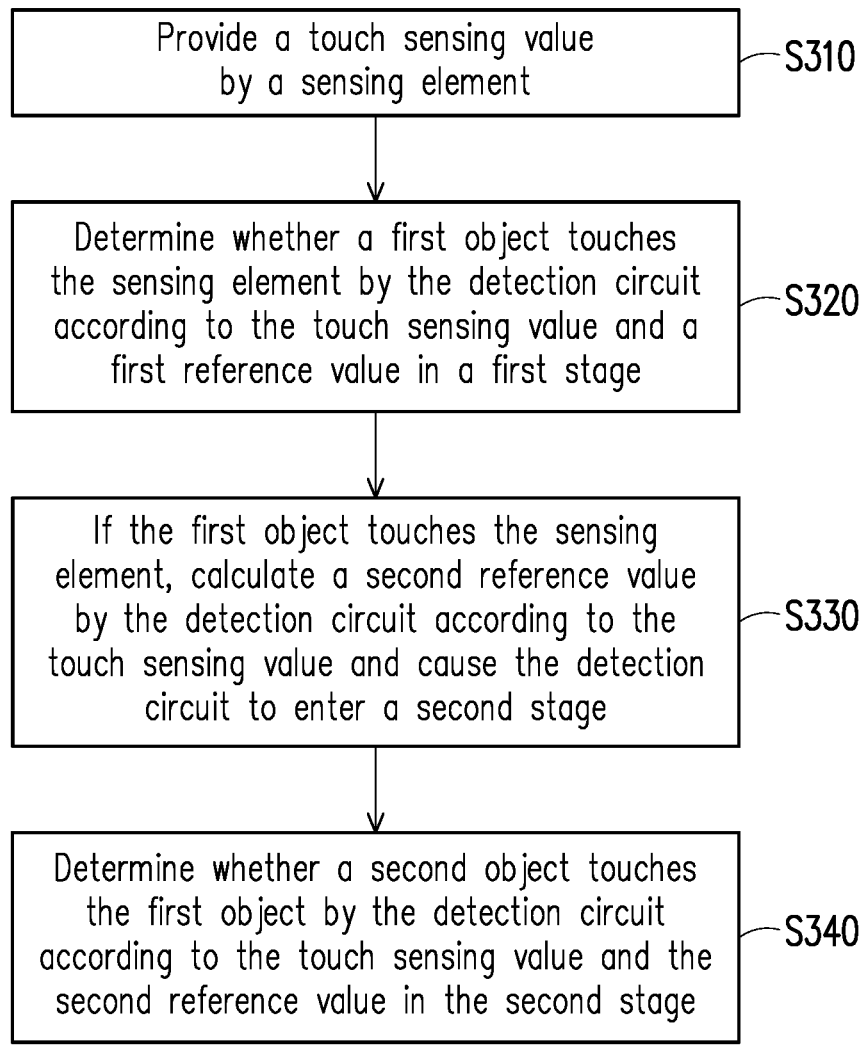
FIG. 3 is a flow diagram of a touch detection method according to an embodiment of the present invention.

FIG. 3 is a flow diagram of a touch detection method according to an embodiment of the present invention, which may be used for the touch detection apparatus 100 of FIG. 1, but is not limited thereto. Please refer to FIG. 1 to FIG. 3 together. Firstly, in step S310, the touch sensing values SV1-SV4 are provided by the sensing element 120. Then, in step S320, whether the first object OB1 touches the sensing element 120 is determined by the detection circuit 140 according to the touch sensing values SV1-SV4 and a first reference value REF1 in a first stage. Next, in step S330, if determining that the first object OB1 touches the sensing element 120, a second reference value REF2 is calculated by the detection circuit 140 according to the received touch sensing values SV1-SV4 and the detection circuit 140 enters a second stage. Then, in step S340, whether a second object OB2 touches the first object OB1 is determined by the detection circuit 140 according to the received touch sensing values SV1-SV4 and the second reference value REF2 in the second stage.

Figure 4A:
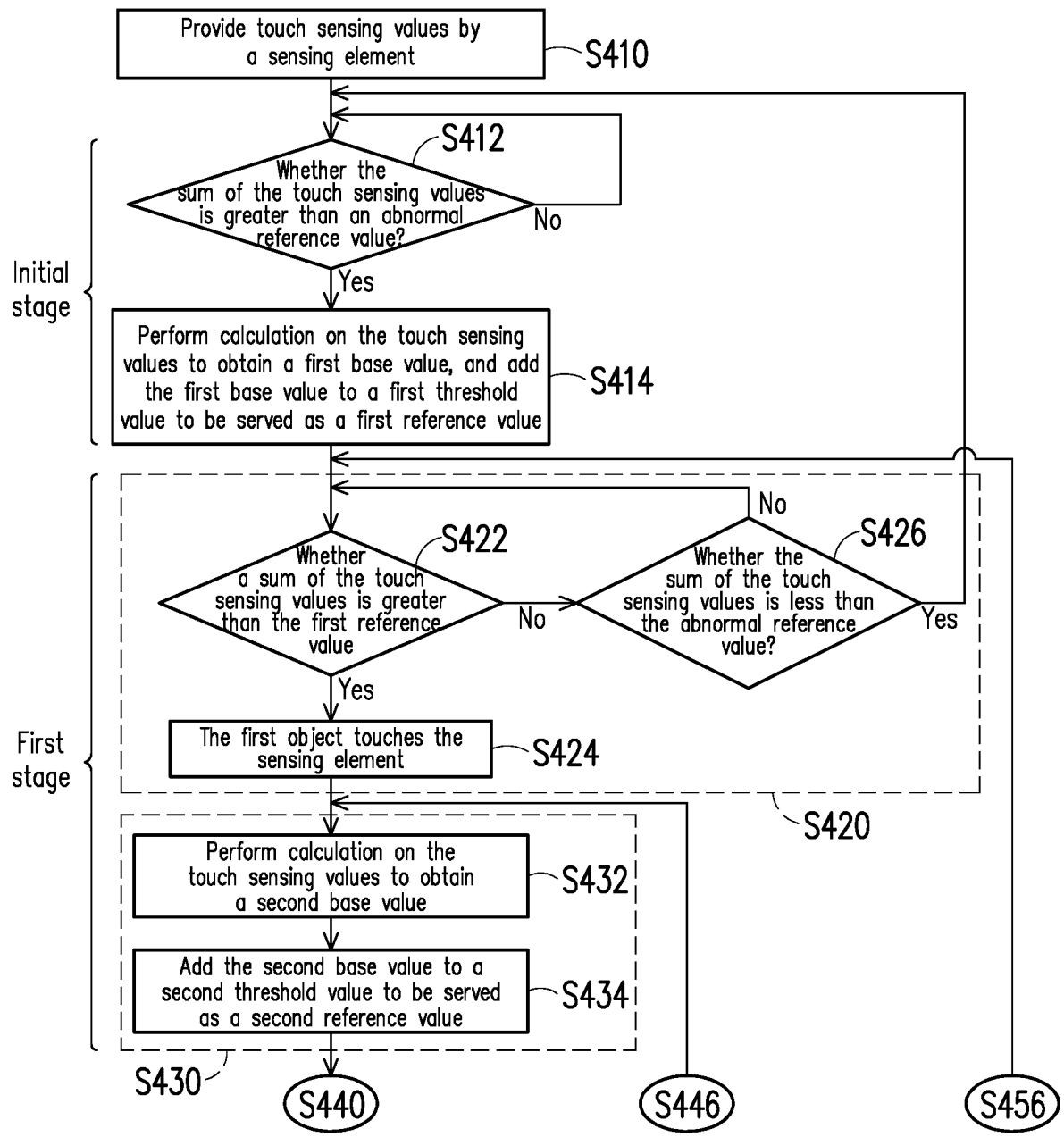
FIG. 4A and FIG. 4B are schematic diagrams of detail steps of a touch detection method according to an embodiment of the present invention.
Figure 4B:
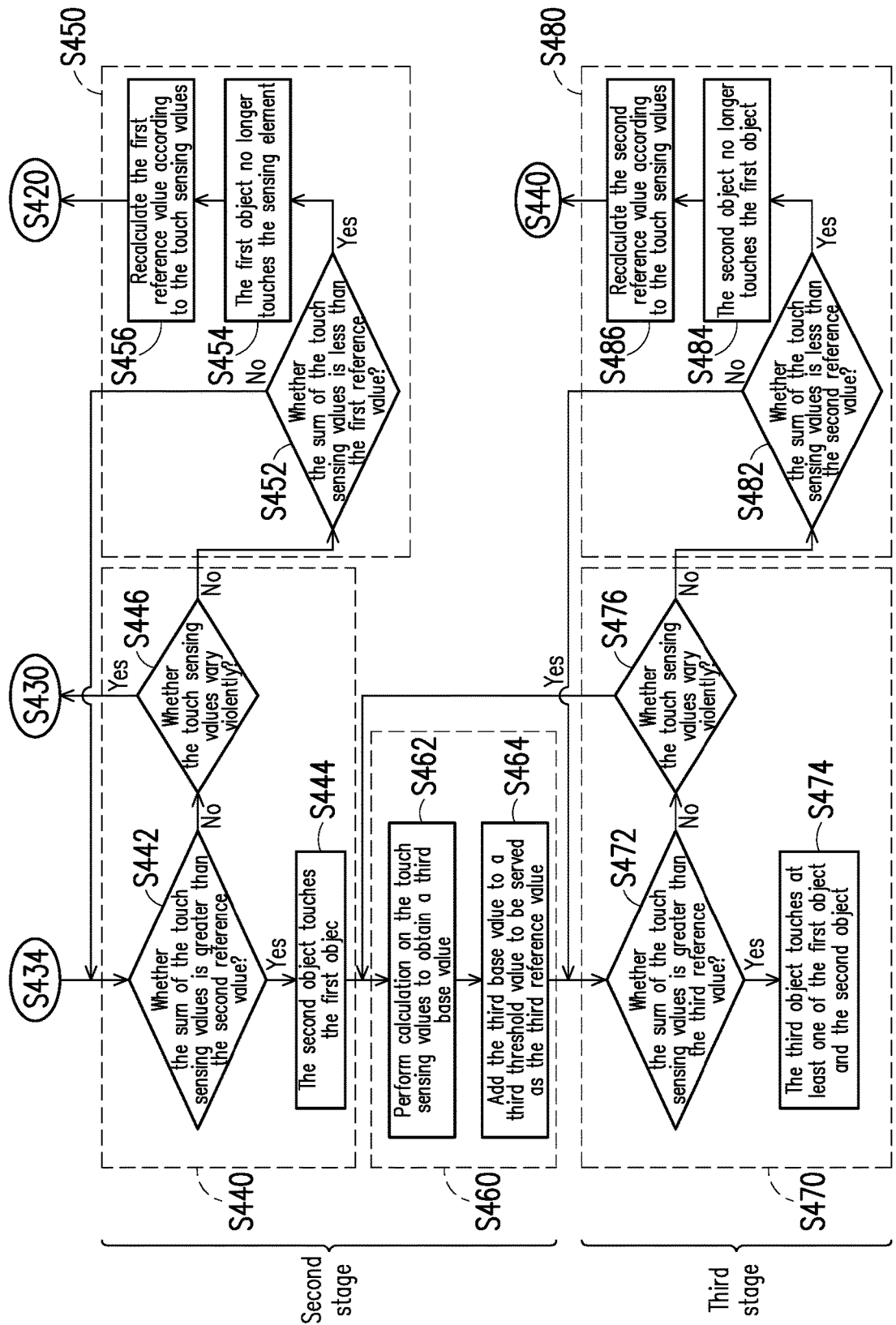
Figure 5:
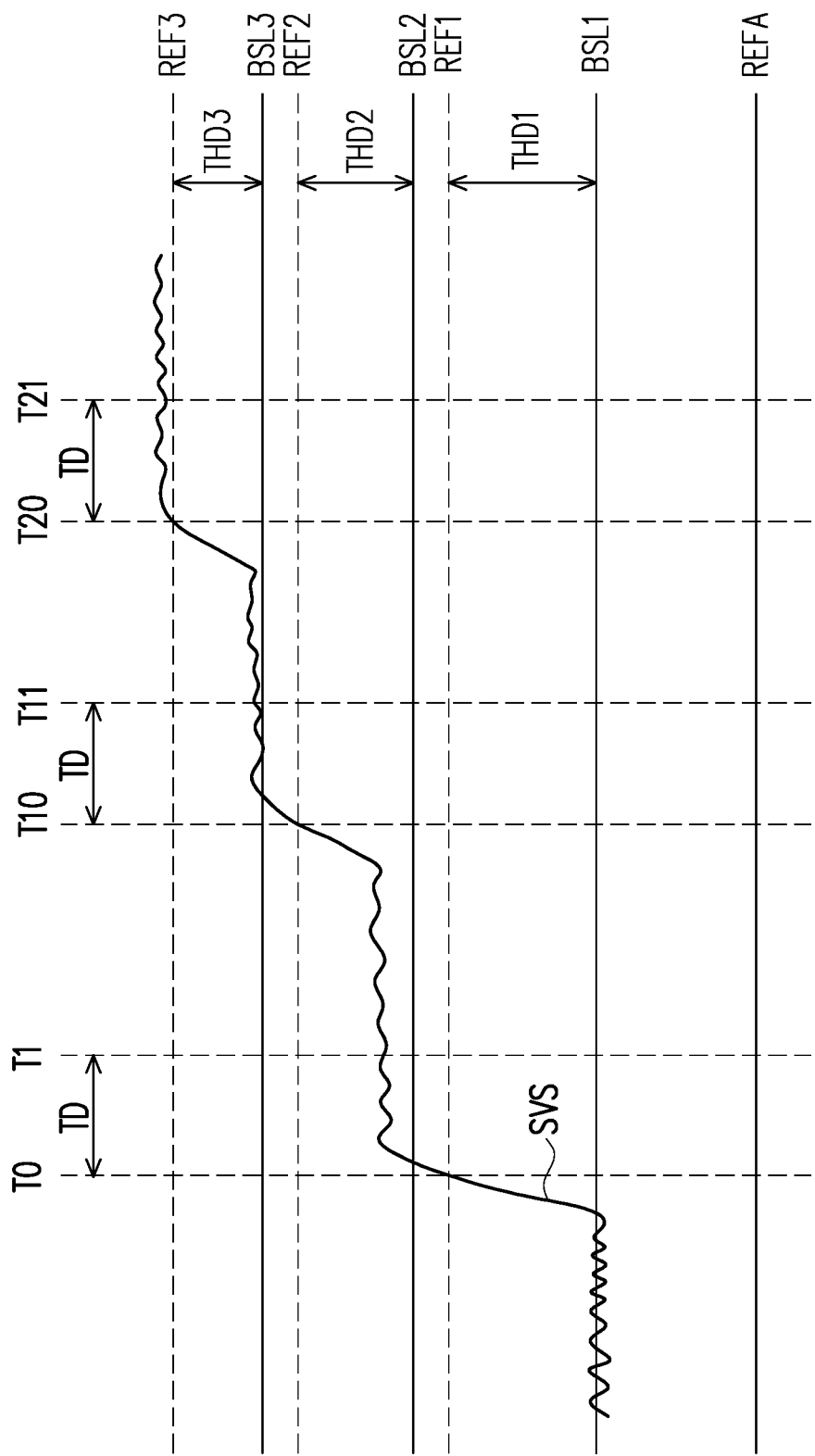
FIG. 5 is a schematic diagram of a sum of touch sensing values in different touch conditions according to an embodiment of the present invention.

Furthermore, FIG. 4A and FIG. 4B are schematic diagrams of detail steps of the touch detection method according to an embodiment of the present invention. FIG. 5 is a schematic diagram of a sum of touch sensing values in different touch conditions according to an embodiment of the present invention. Please refer to FIG. 1, FIG. 2A, FIG. 4A and FIG. 5 together. In the following, assuming that the first object OB1 touches an area of the sensing electrode unit 121, such that the touch sensing value SV1 generated by the sensing element 120 varies along with different touch conditions. Firstly, in step S410, the sensing element 120 provides the touch sensing values SV1-SV4. Then, in an initial stage that the first object OB1 has not touched the sensing element 120 (directly or indirectly) yet, the detection circuit 140 determines whether the sum SVS of the currently received touch sensing values SV1-SV4 is greater than an abnormal reference value REFA, as shown in step S412. If the determination result of step S412 is no, indicating that the touch detection apparatus 100 is abnormal, for example, the sensing element 120 or the detection circuit 140 is abnormal, then stay in step S412. If the determination result of step S412 is yes, indicating that the sensing element 120 is normal, and therefore, in step S414, the detection circuit 140 performs calculation on the currently received touch sensing values SV1-SV4 to obtain a first base value BSL1, and adds the first base value BSL1 to a first threshold value THD1 to be served as the first reference value REF1, wherein the first reference value REF1 is greater than the abnormal reference value REFA. It may be understood that, the first reference value REF1 is relevant to the touch sensing values SV1-SV4. The detection circuit 140 enters the first stage after step S414.

In an embodiment of the present invention, that the touch detection apparatus 100 is abnormal may be, for example, the reference potential VSS of the detection circuit 140 is ungrounded or poorly grounded, or the detection circuit 140 is disturbed by noise, or the sensing element 120 is damaged, causing the fact that the sum SVS of the current touch sensing values SV1-SV4 received by the detection circuit 140 is less than the abnormal reference value REFA, but the present invention is not limited thereto.

In an embodiment, in step S414, the detection circuit 140 may, for example, adopt an average algorithm to perform average calculating operation on the currently received touch sensing values SV1-SV4 to obtain the first base value BSL1, but is not limited thereto.

Then, in step S420 of the first stage, the detection circuit 140 determines whether the first object OB1 touches the sensing element 120 according to the currently received touch sensing values SV1-SV4 and the first reference value REF1. In detail, step S420 includes detailed steps S422, S424 and S426. Firstly, in step S422, the detection circuit 140 determines whether the sum SVS of the currently received touch sensing values SV1-SV4 is greater than the first reference value REF1. If the determination result of step S422 is yes, in step S424, the detection circuit 140 determines that the first object OB1 touches the sensing element 120.

In contrast, if the determination result of step S422 is no, indicating that the first object OB1 does not touch the sensing element 120 (directly or indirectly), and then in step S426, the detection circuit 140 determines whether the sum SVS of the currently received touch sensing values SV1-SV4 is less than the abnormal reference value REFA. If the determination result of step S426 is yes, the detection circuit 140 determines that the touch detection apparatus 100 is abnormal and returns to step S412 of the initial stage. In contrast, if the determination result of step S426 is no, indicating that the sensing element 120 is normal, and then the detection circuit 140 returns to step S422.

In an embodiment of the present invention, after the sum SVS of the touch sensing values SV1-SV4 is continuously greater than the first reference value REF1 for a preset time length, the detection circuit 140 may determine that the first object OB1 touches the sensing element 120. For example, at the time point T0 as shown in FIG. 5, the sum SVS of the touch sensing values SV1-SV4 starts to be greater than the first reference value REF1. Moreover, the sum SVS of the touch sensing values SV1-SV4 at the time point T1 has already been greater than the first reference value REF1 for preset time length TD, therefore, the detection circuit 140 determines that the first object OB1 touches the sensing element 120 at the time point T1, so as to avoid the occurrence of the situation of misjudgment.

Then, in step S430 after step S420, the detection circuit 140 calculates the second reference value REF2 according to the currently received touch sensing values SV1-SV4 and enters the second stage. In detail, step S430 may include detailed steps S432 and S434. In step S432, the detection circuit 140 performs calculation on the currently received touch sensing values SV1-SV4 to obtain a second base value BSL2. Then, in step S434, the detection circuit 140 adds the second base value BSL2 to a second threshold value THD2 to be served as the second reference value REF2, wherein the second reference value REF2 is greater than the first reference value REF1. It may be understood that, the second reference value REF2 is relevant to the touch sensing values SV1-SV4.

In an embodiment of the present invention, in step S432, the detection circuit 140 may, for example, adopt an average algorithm to perform average calculating operation on the currently received touch sensing values SV1-SV4 to obtain the second base value BSL2, but is not limited thereto.

In an embodiment of the present invention, the variation of the touch sensing values SV1-SV4 caused by the fact that the second object OB2 touches the first object OB1 will be generally less than the sum SVS of the touch sensing values SV1-SV4 caused by the fact that the first object OB1 touches the sensing element 120, and therefore, the second threshold value THD2 adopted by the present embodiment is less than the first threshold value THD1, but is not limited thereto.

Please refer to FIG. 1, FIG. 2A, FIG. 4B and FIG. 5 together. After step S434, in step S440 of the second stage, the detection circuit 140 determines whether the second object OB2 touches the first object OB1 according to the currently received touch sensing values SV1-SV4 and the second reference value REF2. In detail, step S440 may include detailed steps S442, S444 and S446. In step S442, the detection circuit 140 determines whether the sum SVS of the currently received touch sensing values SV1-SV4 is greater than the second reference value REF2.

If the determination result of step S442 is no, indicating that the first object OB1 is not touched by the second object OB2, and then in step S446, the detection circuit 140 determines whether the currently received touch sensing values SV1-SV4 vary violently. If the determination result of step S446 is yes, indicating that the touch sensing values SV1-SV4 may be affected by external noise, and therefore, it needs to return to step S430, and recalculate the second reference value REF2 according to the touch sensing values SV1-SV4. If the determination result of step S446 is no, step S450 of the second stage is performed, wherein step S450 may include detailed steps S452, S454 and S456.

Firstly, in step S452, the detection circuit 140 determines whether the sum SVS of the currently received touch sensing values SV1-SV4 is less than the first reference value REF1. If the determination result of step S452 is yes, in step S454, the detection circuit 140 determines that the first object OB1 no longer touches the sensing element 120. Then, in step S456, the detection circuit 140 recalculates the first reference value REF1 according to the currently received touch sensing values SV1-SV4, and returns to step S420 of the first stage.

On the other hand, if the determination result of step S442 is yes, in step S444, the detection circuit 140 determines that the second object OB2 touches the first object OB1. In an embodiment of the present invention, after the sum SVS of the touch sensing values SV1-SV4 is continuously greater than the second reference value REF2 for a preset time length, the detection circuit 140 may determine that the second object OB2 touches the first object OB1. For example, at the time point T10 shown in FIG. 5, the sum SVS of the touch sensing values SV1-SV4 starts to be greater than the second reference value REF2. Moreover, the sum SVS of the touch sensing values SV1-SV4 at the time point T11 has already been continuously greater than the second reference value REF2 for preset time length TD, and therefore, the detection circuit 140 determines that the second object OB2 touches the first object OB1 at the time point T11, so as to avoid the occurrence of the situation of misjudgment.

Then, in step S460 after step S444, the detection circuit 140 calculates a third reference value REF3 according to the currently received touch sensing values SV1-SV4 and enters a third stage. In detail, step S460 may include detailed steps S462 and S464. In step S462, the detection circuit 140 performs calculation on the currently received touch sensing values SV1-SV4 to obtain a third base value BSL3. Then, in step S464, the detection circuit 140 adds the third base value BSL3 to a third threshold value THD3 to be served as the third reference value REF3, wherein the third reference value REF3 is greater than the second reference value REF2, and the third threshold value THD3 is less than the second threshold value THD2. It may be understood that, the third reference value REF3 is relevant to the touch sensing values SV1-SV4.

In an embodiment of the present invention, in step S462, the detection circuit 140 may, for example, adopt an average algorithm to perform average calculating operation on the currently received touch sensing values SV1-SV4 to obtain the third base value BSL3, but is not limited thereto.

Please refer to FIG. 1, FIG. 2B, FIG. 2C, FIG. 4B and FIG. 5 together in the following. In step S470 at the third stage, the detection circuit 140 determines whether the third object OB3 touches at least one of the first object OB1 and the second object OB2 according to the currently received touch sensing values SV1-SV4 and the third reference value REF3. In detail, step S470 may include detailed steps S472, S474 and S476. In step S472, the detection circuit 140 determines whether the sum SVS of the currently received touch sensing values SV1-SV4 is greater than the third reference value REF3. If the determination result of step S472 is yes, in step S474, the detection circuit 140 determines that the third object OB3 touches at least one of the first object OB1 and the second object OB2.

In an embodiment of the present invention, after the sum SVS of the touch sensing values SV1-SV4 is continuously greater than the third reference value REF3 for preset time length, the detection circuit 140 may determine that the third object OB3 touches at least one of the first object OB1 and the second object OB2. For example, at the time point T20 shown in FIG. 5, the sum SVS of the touch sensing values SV1-SV4 starts to be greater than the third reference value REF3. Moreover, the sum SVS of the touch sensing values SV1-SV4 at the time point T21 has already been continuously greater than the third reference value REF3 for preset time length TD, and therefore, the detection circuit 140 determines that the third object OB3 touches at least one of the first object OB1 and the second object OB2 at the time point T21, so as to avoid the occurrence of the situation of misjudgment.

If the determination result of step S472 is no, indicating the third object OB3 does not touch at least one of the first object OB1 and the second object OB2, and then in step S476, the detection circuit 140 determines whether the touch sensing values SV1-SV4 vary violently. If the determination result of step S476 is yes, indicating that the touch sensing values SV1-SV4 may be affected by external noise, and therefore, it needs to return to step S460, and recalculate the third reference value REF3 according to the touch sensing values SV1-SV4. If the determination result of step S476 is no, step S480 of the third stage is performed, wherein step S480 may include detailed steps S482, S484 and S486.

Firstly, in step S482, the detection circuit 140 determines whether the sum SVS of the currently received touch sensing values SV1-SV4 is less than the second reference value REF2. If the determination result of step S482 is yes, in step S484, the detection circuit 140 determines that the second object OB2 no longer touches the first object OB1. Then, in step S486, the detection circuit 140 recalculates the second reference value REF2 according to the currently received touch sensing values SV1-SV4, and returns to step S440 (S442) of the second stage.

Moreover, a touch detection method for four objects or more than four objects may be learned by analogy according to the foregoing illustration, and is not further described herein.

To sum up, the touch detection apparatus and the touch detection method provided by the embodiment of the present invention may determine whether the second object touches the first object under the condition that the first object touches the sensing element. Thus, the application of the touch detection apparatus is wider. Moreover, the detection circuit determines the touch condition according to the touch sensing values provided by the sensing element, and the detection circuit does not send a detection signal to the first object or the second object to determine the touch condition, and therefore, the use safety may be improved.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A touch detection apparatus, comprising:
    a sensing element, configured to generate at least one touch sensing value; and
    a detection circuit, coupled to the sensing element to receive the at least one touch sensing value, and determines whether a first object touches the sensing element according to the at least one touch sensing value and a first reference value in a first stage, and if the first object touches the sensing element, the detection circuit calculates a second reference value according to the at least one touch sensing value and enters a second stage,
    wherein the detection circuit determines whether a second object touches the first object according to the at least one touch sensing value and the second reference value in the second stage,
    wherein in an initial stage before the first stage, the detection circuit determines whether a sum of the at least one touch sensing value is greater than an abnormal reference value, and if the sum of the at least one touch sensing value is greater than the abnormal reference value, the detection circuit performs calculation on the at least one touch sensing value to obtain a first base value, and adds the first base value to a first threshold value to be served as the first reference value.

2. The touch detection apparatus according to claim 1, wherein the detection circuit determines whether the sum of the at least one touch sensing value is greater than the first reference value in the first stage, and if the sum of the at least one touch sensing value is greater than the first reference value, the detection circuit determines that the first object touches the sensing element.

3. The touch detection apparatus according to claim 1, wherein in the first stage, if the detection circuit determines that the first object touches the sensing element, the detection circuit performs calculation on the at least one touch sensing value to obtain a second base value, and adds the second base value to a second threshold value to be served as the second reference value, wherein the second threshold value is less than the first threshold value.

4. The touch detection apparatus according to claim 3, wherein
    the detection circuit determines whether the sum of the at least one touch sensing value is greater than the second reference value in the second stage, and if the sum of the at least one touch sensing value is greater than the second reference value, the detection circuit determines that the second object touches the first object, and the detection circuit calculates a third reference value according to the at least one touch sensing value and enters a third stage,
    wherein the detection circuit determines whether a third object touches at least one of the first object and the second object according to the at least one touch sensing value and the third reference value in the third stage.

5. The touch detection apparatus according to claim 4, wherein in the second stage, if the detection circuit determines that the second object touches the first object, the detection circuit performs calculation on the at least one touch sensing value to obtain a third base value, and adds the third base value to a third threshold value to be served as the third reference value, wherein the third threshold value is less than the second threshold value.

6. The touch detection apparatus according to claim 4, wherein the detection circuit determines whether the sum of the at least one touch sensing value is greater than the third reference value in the third stage, and if the sum of the at least one touch sensing value is greater than the third reference value, the detection circuit determines that the third object touches at least one of the first object and the second object.

7. The touch detection apparatus according to claim 4, wherein the detection circuit determines whether the sum of the at least one touch sensing value is less than the second reference value in the third stage, and if the sum of the at least one touch sensing value is less than the second reference value, the detection circuit determines that the second object no longer touches the first object, and the detection circuit recalculates the second reference value according to the at least one touch sensing value and returns to the second stage.

8. The touch detection apparatus according to claim 4, wherein the detection circuit determines whether the sum of the at least one touch sensing value is less than the abnormal reference value, and if the sum of the at least one touch sensing value is less than the abnormal reference value, the detection circuit determines that the touch detection apparatus is abnormal and returns to the initial stage.

9. The touch detection apparatus according to claim 1, wherein the detection circuit determines whether the sum of the at least one touch sensing value is less than the first reference value in the second stage, and if the sum of the at least one touch sensing value is less than the first reference value, the detection circuit determines that the first object no longer touches the sensing element, and the detection circuit recalculates the first reference value according to the at least one touch sensing value and returns to the first stage.

10. A touch detection method, comprising:
providing at least one touch sensing value by a sensing element;
determining whether a first object touches the sensing element by a detection circuit according to the at least one touch sensing value and a first reference value in a first stage;
if the first object touches the sensing element, calculating a second reference value by the detection circuit according to the at least one touch sensing value and causing the detection circuit to enter a second stage;
determining whether a second object touches the first object by the detection circuit according to the at least one touch sensing value and the second reference value in the second stage;
in an initial stage before the first stage, determining whether a sum of the at least one touch sensing value is greater than an abnormal reference value by the detection circuit; and
if the sum of the at least one touch sensing value is greater than the abnormal reference value, performing calculation on the at least one touch sensing value by the detection circuit to obtain a first base value, and adding the first base value to a first threshold value to be served as the first reference value.

11. The touch detection method according to claim 10, wherein the step of determining whether the first object touches the sensing element according to the at least one touch sensing value and the first reference value in the first stage comprises:
determining whether the sum of the at least one touch sensing value is greater than the first reference value; and
determining that the first object touches the sensing element if the sum of the at least one touch sensing value is greater than the first reference value.

12. The touch detection method according to claim 10, wherein the step of calculating the second reference value according to the at least one touch sensing value comprises:
performing calculation on the at least one touch sensing value by the detection circuit to obtain a second base value; and
adding the second base value to a second threshold value to be served as the second reference value, wherein the second threshold value is less than the first threshold value.

13. The touch detection method according to claim 12, wherein the step of determining whether the second object touches the first object according to the at least one touch sensing value and the second reference value in the second stage comprises:
determining whether the sum of the at least one touch sensing value is greater than the second reference value in the second stage; and
determining that the second object touches the first object if the sum of the at least one touch sensing value is greater than the second reference value,
wherein the touch detection method further comprises:
if the second object touches the first object, calculating a third reference value by the detection circuit according to the at least one touch sensing value and causing the detection circuit to enter a third stage; and
determining whether a third object touches at least one of the first object and the second object by the detection circuit according to the at least one touch sensing value and the third reference value in the third stage.

14. The touch detection method according to claim 13, wherein the step of calculating the third reference value according to the at least one touch sensing value comprises:
performing calculation on the at least one touch sensing value to obtain a third base value; and
adding the third base value to a third threshold value to be served as the third reference value, wherein the third threshold value is less than the second threshold value.

15. The touch detection method according to claim 13, wherein the step of determining whether the third object touches at least one of the first object and the second object according to the at least one touch sensing value and the third reference value in the third stage comprises:
determining whether the sum of the at least one touch sensing value is greater than the third reference value in the third stage; and
determining that the third object touches at least one of the first object and the second object if the sum of the at least one touch sensing value is greater than the third reference value.

16. The touch detection method according to claim 13, further comprising:
determining whether the sum of the at least one touch sensing value is less than the second reference value by the detection circuit in the third stage;
if the sum of the at least one touch sensing value is less than the second reference value, deter inning that the second object no longer touches the first object by the detection circuit; and
recalculating the second reference value by the detection circuit according to the at least one touch sensing value and returning to the second stage.

17. The touch detection method according to claim 13, further comprising:
- determining whether the sum of the at least one touch sensing value is less than the abnormal reference value by the detection circuit; and
- if the sum of the at least one touch sensing value is less than the abnormal reference value, determining that the touch detection apparatus is abnormal by the detection circuit and returning to the initial stage.

18. The touch detection method according to claim 10, further comprising:
- determining whether the sum of the at least one touch sensing value is less than the first reference value by the detection circuit in the second stage;
- if the sum of the at least one touch sensing value is less than the first reference value, determining that the first object no longer touches the sensing element by the detection circuit; and
- recalculating the first reference value by the detection circuit according to the at least one touch sensing value and returning to the first stage.

\* \* \* \* \*